Aug. 12, 1924.

F. V. SAMS 1,504,720

CENTRIFUGAL SHORT CIRCUITING AND BRUSH LIFTING DEVICE

Filed Aug. 23, 1919

Inventor
F. V. Sams
by
Attorney

Patented Aug. 12, 1924.

1,504,720

UNITED STATES PATENT OFFICE.

FRED V. SAMS, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

CENTRIFUGAL SHORT-CIRCUITING AND BRUSH-LIFTING DEVICE.

Application filed August 23, 1919. Serial No. 320,288.

*To all whom it may concern:*

Be it known that FRED V. SAMS, a citizen of the United States of America, residing at Milwaukee, in the county of Milwaukee and State of Wisconsin, has invented a certain new and useful Improvement in Centrifugal Short-Circuiting and Brush-Lifting Devices, of which the following is a specification.

This invention relates to automatic short-circuiting and brush lifting devices. One of the uses of said devices is in connection with the automatic control of the circuits of wound rotor induction motors. Such motors are customarily provided with slip rings connected in any desirable manner with the windings of the rotor, contact being usually made with the slip rings by means of brushes. After the motor has been brought up to speed the rotor windings are usually short-circuited and it is no longer necessary that the brushes remain in contact with the slip rings. It therefore becomes desirable, in order to increase the life of the rings and brushes, to bring these elements out of engagement with each other. It is one of the objects of this invention to provide a device in which the short-circuiting is accomplished automatically as is also the disengagement of the brushes and slip rings.

Another object of the invention is the provision of a device in which the desired results are secured by means of a centrifugally actuatable member.

Another object of the invention is the provision of a device in which short-circuiting is accomplished with certainty before the brushes and slip rings are disengaged in order that there may be no arcing. Other objects will appear hereinafter as the description of the invention proceeds.

The novel features of the invention will appear from this specification and the accompanying drawings disclosing one embodiment of said invention, and all of these novel features are intended to be pointed out in the claims.

Figure 1:
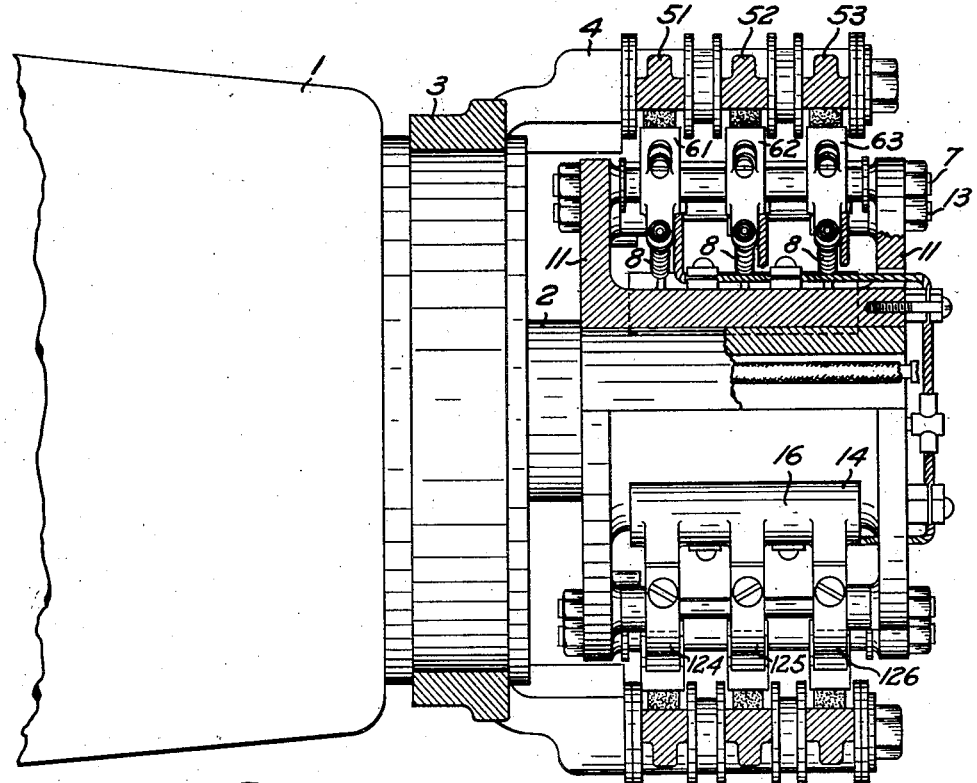

In the drawings Fig. 1 is a side elevation of a device embodying the features of the invention, some of the parts being in section.

Figure 2:
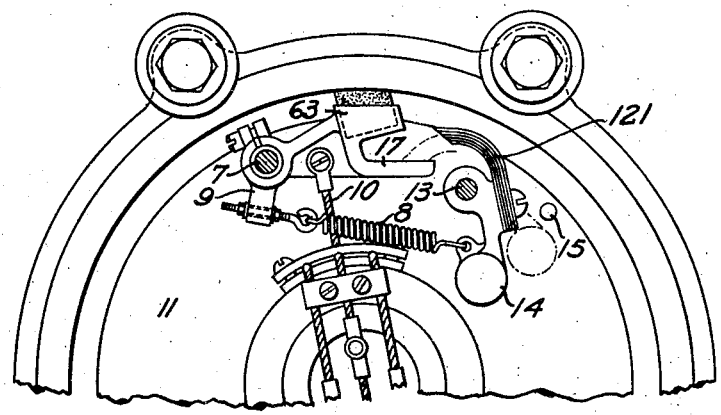

Fig. 2 is an end elevation of the upper half of the device shown in Fig. 1.

The device is shown in Fig. 1 as applied to an induction motor having a bearing housing 1 carrying the shaft 2. A ring support 3 is mounted in any suitable manner on a portion of the bearing housing and carries studs 4 for supporting the slip rings 51, 52, 53, the latter being insulated from each other in any suitable manner. Brushes, comprising holders 61, 62, 63 are provided coactable with the slip rings, and are here shown mounted for pivotal movement about the pin 7, carried in a flanged collar 11 fastened in any suitable manner to the shaft 2. Each brush may be biased into engagement with its respective slip ring by a spring 8 adjustably connected to a projection 9 associated with the pivoted brush as clearly shown in Fig. 2. Each brush has electrically connected thereto a flexible conductor 10, which latter conductors may be led to any desired point as to the rotor winding along or through the shaft.

A contact or switch member is provided for short-circuiting the brushes and lifting them out of engagement with the slip rings, comprising a plurality of contacts, one of which 121 is shown most clearly in Fig. 2. There may be as many component parts to the switch member as there are brushes although it is obvious that the three individual contacts best seen in the duplicate short-circuiting device in the lower half of Fig. 1 (124, 125, 126) might be one integral contact member bridging across all three brushes. The switch member is here shown as mounted for pivotal movement about the pin 13 which latter is also mounted in the flanged collar 11. In order that the switch member may rotate in a counter-clockwise direction, as viewed in Fig. 2, when the shaft 2 reaches a predetermined speed the switch member may be provided with a weight 14, although the weight of the switch support may be itself sufficient. The outward movement of the switch member and attached weight is limited by means of the stop 15. Where individual switch contacts are utilized as shown, it is convenient to construct the weight 14, as is clear from Fig. 1, with connecting portions 16, whereby all of the switch members will not only move in unison but will also be electrically connected by means of the weight. The switch member is here shown as biased away from the brushes by means of the same springs 8 which are used for biasing the brushes into engagement with the slip rings, although these parts may be restrained in any other suitable manner.

Each brush has mounted thereon or integral therewith a conducting projection 17 which extends into the path of movement of the switch member. When the speed of the shaft 2 rises to a predetermined value the centrifugal force developed by the weight 14 will be sufficient to overcome the restraining action of the springs 8 whereupon the switch member will move into the broken line position indicated on Fig. 2, thus making contact with each projection 17 thereby short-circuiting the brushes. Further movement in the same direction of the switch member will lift the brushes out of engagement with the slip rings.

It should be understood that it is not desired that the invention claimed be limited to the exact details of contruction shown and described, for obvious modifications will occur to a person skilled in the art.

It is claimed and desired to secure by Letters Patent:

1. In combination, a relatively stationary conducting ring, rotatable means, a brush movably mounted on said rotatable means coactable with said ring, means for biasing said brush into engagement with said ring, a contact movably mounted on said rotatable means, a weight adapted to be moved by centrifugal force rigidly associated with said contact, means for restraining said weight, and a conducting projection associated with said brush extending into the path of movement of said contact means whereby said contact will first engage said projection and then move said brush out of engagement with said ring.

2. In combination with a conducting member, a pivotally mounted contact member for making contact with said conducting means, a conducting projection associated with said contact member, and centrifugally actuatable contact means comprising a pivoted lever having a weight at one end and a contact at the other end for first making electrical contact with said contact making means and then by further movement of said centrifugally actuatable contact means moving said contact making means out of contact with said conducting member.

3. In combination with a relatively stationary conducting ring, rotatable means, a brush member pivotally mounted on said rotatable means and coactable with said ring, a contact member movably mounted on said rotatable means, a weight adapted to be moved by centrifugal force associated with said contact member, a conducting portion of said brush member extending into the path of movement of said contact member, and a spring attached at one end to said brush member and at the other end to said contact member.

4. In combination with a relatively stationary conducting ring, rotatable means, a brush member pivotally mounted on said rotatable means and coactable with said ring, a centrifugally actuable contact member comprising a contact and a weight rigidly associated therewith mounted for pivotal movement on said rotatable means, a conducting portion of said brush member extending into the path of movement of said contact, and a spring attached at one end of said brush member and at the other to said centrifugally actuatable contact member.

5. In combination, a conducting ring, rotatable means, a brush member movably mounted on said rotatable means and coactable with the internal periphery of said ring, centrifugally actuatable contact means for first making contact with said brush member and then by further movement of said centrifugally actuable means moving said brush member out of contact with said ring, and a single spring for biasing said brush member into contact with said ring, and for biasing said centrifugally actuable means against centrifugal force.

6. In combination with a conducting means, contact means movable into engagement with said conducting means, a rotatable member, means in which centrifugal force is generated by rotation of said member and by which force said means is movable, a contact rigidly associated with and movable with said centrifugally movable means to first make electrical contact with said contact means and then by further movement moving said contact means out of engagement with said conducting means.

In testimony whereof, the signature of the inventor is affixed hereto.

FRED V. SAMS.

Certificate of Correction.

It is hereby certified that in Letters Patent No. 1,504,720, granted August 12, 1924, upon the application of Fred V. Sams, of Milwaukee, Wisconsin, for an improvement in "Centrifugal Short-Circuiting and Brush-Lifting Devices," an error appears in the printed specification requiring correction as follows: Page 2, line 84, claim 4, for the word "of" read *to;* and that the said Letters Patent should be read with this correction therein that the same may conform to the record of the case in the Patent Office.

Signed and sealed this 14th day of October, A. D. 1924.

[SEAL.]

KARL FENNING,
*Acting Commissioner of Patents.*